United States Patent
Kim et al.

(10) Patent No.: US 11,272,688 B2
(45) Date of Patent: Mar. 15, 2022

(54) PET BATH

(71) Applicant: LG Electronics Inc., Seoul (KR)

(72) Inventors: Minchul Kim, Seoul (KR); Kyungrae Kim, Seoul (KR); Sangwoo Woo, Seoul (KR); Soungbong Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 209 days.

(21) Appl. No.: 16/586,319

(22) Filed: Sep. 27, 2019

(65) Prior Publication Data

US 2020/0100465 A1    Apr. 2, 2020

(30) Foreign Application Priority Data

Sep. 29, 2018 (KR) .......................... 10-2018-0116665

(51) Int. Cl.
*A01K 13/00* (2006.01)

(52) U.S. Cl.
CPC .................. *A01K 13/001* (2013.01)

(58) Field of Classification Search
CPC ...... A01K 13/001; A01K 15/04; A01K 29/00; A01K 1/0254; A01K 1/033; A01K 1/0035; A61D 7/00; A61D 11/00
USPC ................. 119/668, 673, 676, 665, 601, 671
See application file for complete search history.

(56) References Cited

U.S. PATENT DOCUMENTS

| | | | | |
|---|---|---|---|---|
| 2,611,341 A | * | 9/1952 | Paris ................... | A01K 13/001 119/675 |
| 3,842,803 A | * | 10/1974 | Temel ................... | A01K 1/011 119/163 |
| 4,011,836 A | * | 3/1977 | Temel ................... | A01K 1/011 119/163 |
| 4,379,438 A | * | 4/1983 | Peardon ................. | A61D 11/00 119/675 |
| 4,527,511 A | * | 7/1985 | Richards .............. | A01K 13/001 119/161 |
| 5,148,771 A | * | 9/1992 | Schuett ................... | A01K 1/01 119/479 |
| 5,448,966 A | * | 9/1995 | McKinnon ........... | A01K 13/001 119/676 |
| 5,724,918 A | * | 3/1998 | Navalon-Chicote ........ | A01K 13/001 119/668 |

(Continued)

FOREIGN PATENT DOCUMENTS

| | | | | |
|---|---|---|---|---|
| KR | 200472302 Y1 | * | 4/2014 | |
| WO | WO-2019017591 A1 | * | 1/2019 | ........... A01K 13/001 |
| WO | WO-2019225862 A1 | * | 11/2019 | ............. A01K 13/00 |

*Primary Examiner* — Ebony E Evans
(74) *Attorney, Agent, or Firm* — Fish & Richardson P.C.

(57) ABSTRACT

Disclosed herein is a pet bath. The pet bath includes an outer cabinet to form an external appearance of the pet bath and having an open front surface, an inner cabinet provided within the outer cabinet to define a bathing enclosure and having an open front surface, a door configured to open and close the open front surfaces of the outer and inner cabinets, a washing device to spray washing water to the inside of the bathing enclosure, an air blower disposed between the outer cabinet and the inner cabinet, an air heater to heat air flowing due to operation of the air blower, and a plurality of air nozzles rotatably disposed on at least one surface of the inner cabinet and having air nozzle holes, and the air nozzle holes are spaced apart from centers of rotation of the corresponding air nozzles by a designated distance.

16 Claims, 10 Drawing Sheets

(56) References Cited

U.S. PATENT DOCUMENTS

| | | | | |
|---|---|---|---|---|
| 7,080,608 B1* | 7/2006 | Arndt | .................... | A01K 13/001 119/665 |
| 7,100,538 B2* | 9/2006 | Motomura | ........... | A01K 13/001 119/604 |
| 7,497,188 B2* | 3/2009 | Cho | .................... | A01K 13/001 119/604 |
| 8,186,307 B2* | 5/2012 | Moharram | ........... | A01K 13/001 119/651 |
| 9,074,376 B2* | 7/2015 | Dustin | .................... | A01K 1/01 |
| 10,143,182 B1* | 12/2018 | Ferro | ....................... | D06F 18/00 |
| 2011/0017147 A1* | 1/2011 | Petruzzi | ............... | A01K 13/001 119/604 |
| 2012/0037085 A1* | 2/2012 | Caisse | .................. | A01K 13/001 119/676 |
| 2014/0109436 A1* | 4/2014 | Noh | ....................... | D06F 58/206 34/499 |
| 2014/0216077 A1* | 8/2014 | Albert | ....................... | F25B 7/00 62/79 |
| 2017/0354309 A1* | 12/2017 | Kim | .................... | A47L 15/4257 |

\* cited by examiner

PET BATH

CROSS-REFERENCE TO RELATED APPLICATION

This application claims the priority benefit of Korean Patent Application No. 10-2018-0116665, filed on Sep. 29, 2018, the disclosure of which is incorporated herein by reference.

BACKGROUND OF THE INVENTION

1. Field of the Invention

The present disclosure relates to a pet bath, and more particularly, to an apparatus which may wash, rinse and dry a pet living in a residential space of humans.

2. Description of the Related Art

As concern and demand for pets are increased, interest in cleanliness of pets living in the same space as people is also increased.

Bathing of a pet living in a home is mainly performed in a bathroom through a shower and a separate dryer disposed in the bathroom. If bathing of the pet is carried out in the bathroom, when the pet recklessly moves or wags its trunk or tail to instinctively shake water off its body, a time taken to bathe the pet may be elongated, a surrounding environment may be contaminated, or an excessive amount of water may be used.

Therefore, apparatuses which may prepare a designated space for accommodating a pet to be bathed and supply washing water or air to the corresponding space to bathe the pet have been developed now.

Korean Patent Application No. 2003-0020892 A and Korean Utility Model Application No. 2013-0004113 U disclose apparatuses which may restrict movement of a pet during a bathing process.

However, in these cases, a problem of excessive use of water is still present.

Further, both washing and drying of pet are carried out together, structural complexity may be caused, and water may be introduced into an electric device on a flow path for drying and thus cause failure of the electric device.

SUMMARY OF THE INVENTION

An object of the present disclosure is to provide a pet bath which may simultaneously perform washing, rinsing and drying of a pet.

Another object of the present disclosure is to provide a pet bath which may shorten a time taken to dry a pet so as to shorten an overall time taken to bathe the pet.

Another object of the present disclosure is to provide a pet bath which may perform washing or rinsing of a pet using a small amount of water.

Another object of the present disclosure is to provide a pet bath which may safely bath a pet while minimizing displeasure of the pet during bathing.

Yet another object of the present disclosure to provide a pet bath which may secure safe use of a drying device against water splattering to wash or rinse a pet in the apparatus.

The objects of the present disclosure are not limited to the above-mentioned objects and other objects that have not been mentioned above will become evident to those skilled in the art from the following description.

To achieve the above objects, there is provided a pet bath according to an exemplary embodiment of the present disclosure, including an outer cabinet configured to form an external appearance of the pet bath and having an open front surface, an inner cabinet provided within the outer cabinet to define a bathing enclosure and having an open front surface, a door configured to open and close the open front surfaces of the outer cabinet and the inner cabinet, a washing device configured to spray washing water to an inside of the bathing enclosure, an air blower disposed between the outer cabinet and the inner cabinet to generate air flow, an air heater configured to heat the air flowing due to operation of the air blower, and a plurality of air nozzles rotatably disposed on at least one surface of the inner cabinet and having air nozzle holes to spray the air flowing due to operation of the air blower to the inside of the bathing enclosure, wherein the air nozzle holes are spaced apart from centers of rotation of the corresponding air nozzles by a designated distance, and thus, a discharge direction of air toward the inside of the bathing enclosure is changeable.

The air nozzles may have an approximately hemispherical shape, the air nozzle holes may be located eccentrically with respect to the centers of rotation of the air nozzles, and thus, the air discharged to the inside of the bathing enclosure is not concentrated in one direction.

The pet bath may further include a plurality of drivers, each of which is connected to one side of a corresponding one of the air nozzles to rotate the corresponding one of the air nozzles, and thus, the air nozzles may be operated and the positions of the respective air nozzle holes may be changed.

The air nozzles may include a plurality of columns of air nozzle groups configured such that at least a plurality of the air nozzles is connected by the same flow path on one side surface of the inner cabinet.

The pet bath may further include a plurality of air nozzle valves, each of which adjusts air supplied to the air nozzle group in each column, and thus, air may be selectively supplied to the air nozzle groups in the respective columns.

The air nozzles of the air nozzle group in each column connected by the same flow path may be arranged in a vertical direction.

A common flow path configured to raise air flowing from the air nozzle valves and a plurality of branch flow paths branched off from the common flow path to lower flowing air may be disposed in the air nozzle group in each column, and thus, washing water scatting in the bathing enclosure may not be introduced into a flow path of the drying device.

A flow path guide configured to guide air flowing along the common flow path to each of the branch flow paths may be disposed at an upper portion of the corresponding branch flow path, and thus guide flowing in an inflow path.

The pet bath may further include a plurality of columns of driver groups respectively connected to the air nozzles disposed in the columns of the air nozzle groups to respectively rotate the air nozzles in the columns of the air nozzle groups, and thus, the air nozzles in respective columns may be driven by the corresponding driver groups.

When at least one of the air nozzle valves is opened, drivers in the corresponding column connected to an air nozzle group in the corresponding column, to which air is supplied through the at least one opened air nozzle valve, may be operated, and thus, air nozzles to which air is supplied may be rotated.

Inner exhaust holes configured to exhaust air flowing in the bathing enclosure may be formed in an upper surface of the inner cabinet, an outer inflow hole configured to allow external air to flow into the bathing enclosure and an outer exhaust hole configured to exhaust air flowing through the inner exhaust holes to the outside may be formed in the outer cabinet or in a space between the inner cabinet and the outer cabinet, and thus, dry air at the outside may be supplied to the bathing enclosure and humid air in the bathing enclosure may be discharged.

Inner exhaust holes configured to exhaust air flowing in the bathing enclosure may be formed in an upper surface of the inner cabinet, an inflow path configured to guide the air flowing due to operation of the air blower to the air nozzles, an exhaust flow path along which air exhausted from the bathing enclosure via the inner exhaust holes flows, and a circulation flow path along which air flowing along the exhaust flow path flows to a space, in which the air blower is disposed, may be disposed between the inner cabinet and the outer cabinet, and thus, air may be circulated to dry a pet.

The air heater may be a heat pump including a compressor configured to compress a refrigerant, a condenser configured to condense the compressed refrigerant, an expander configured to expand the condensed refrigerant, and an evaporator configured to evaporate the expanded refrigerant, air flowing into the circulation flow path may sequentially pass through the evaporator and the condenser and be supplied to the circulation flow path, and thus, circulated air may be dried and then supplied to the bathing enclosure.

The washing device may include a water collection tank disposed under the inner cabinet, and configured to form a washing water storage space, a circulation pump configured to pump washing water stored in the water collection tank, a lower nozzle disposed in a lower portion of the bathing enclosure to spray the washing water pumped by the circulation pump to the bathing enclosure, and an upper nozzle disposed above the lower nozzle to spray the washing water pumped by the circulation pump to the bathing enclosure, thereby being capable of circulating a designated amount of water to wash the pet.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE EMBODIMENTS

The advantages and features of the present disclosure and the way of attaining the same will become apparent with reference to embodiments described below in conjunction with the accompanying drawings. Reference will now be made in detail to the preferred embodiments of the present disclosure, examples of which are illustrated in the accompanying drawings. Wherever possible, the same reference numbers will be used throughout the drawings to refer to the same or like parts.

In the following description of the embodiments, it will be understood that expressions indicating directions, such as front (F)/rear (R)/left (Le)/right (Ri)/up (U)/down (D), are defined as being illustrated in the respective drawings, but these expressions are merely to provide a better understanding of the present disclosure and may be defined differently based on criteria.

Hereinafter, pet bathes in accordance with the embodiments of the present disclosure will be described with reference to the accompanying drawings.

<Overall Configuration>

Figure 1:
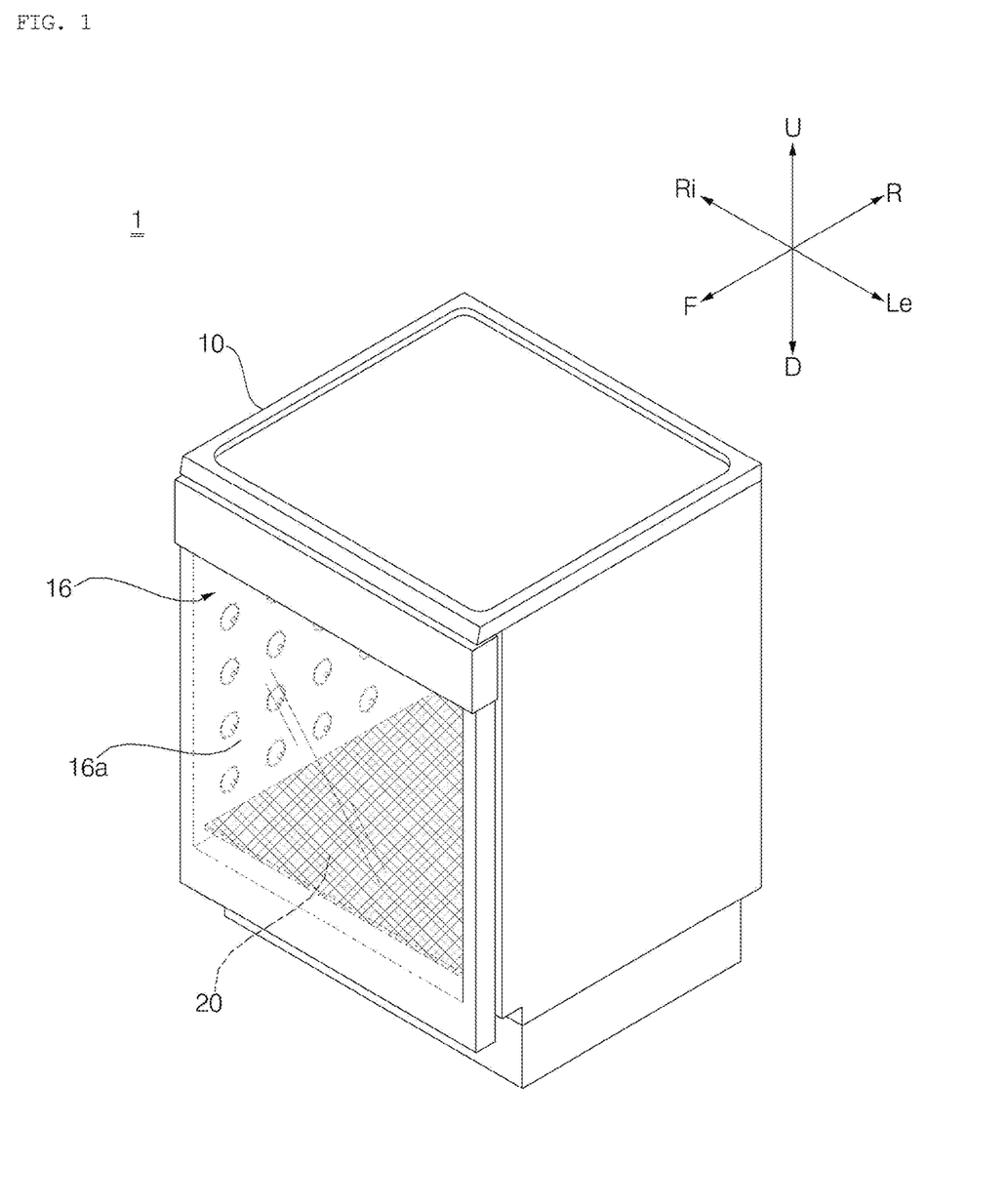
FIG. 1 is a perspective view of a pet bath in accordance with one embodiment of the present disclosure.
Figure 2:
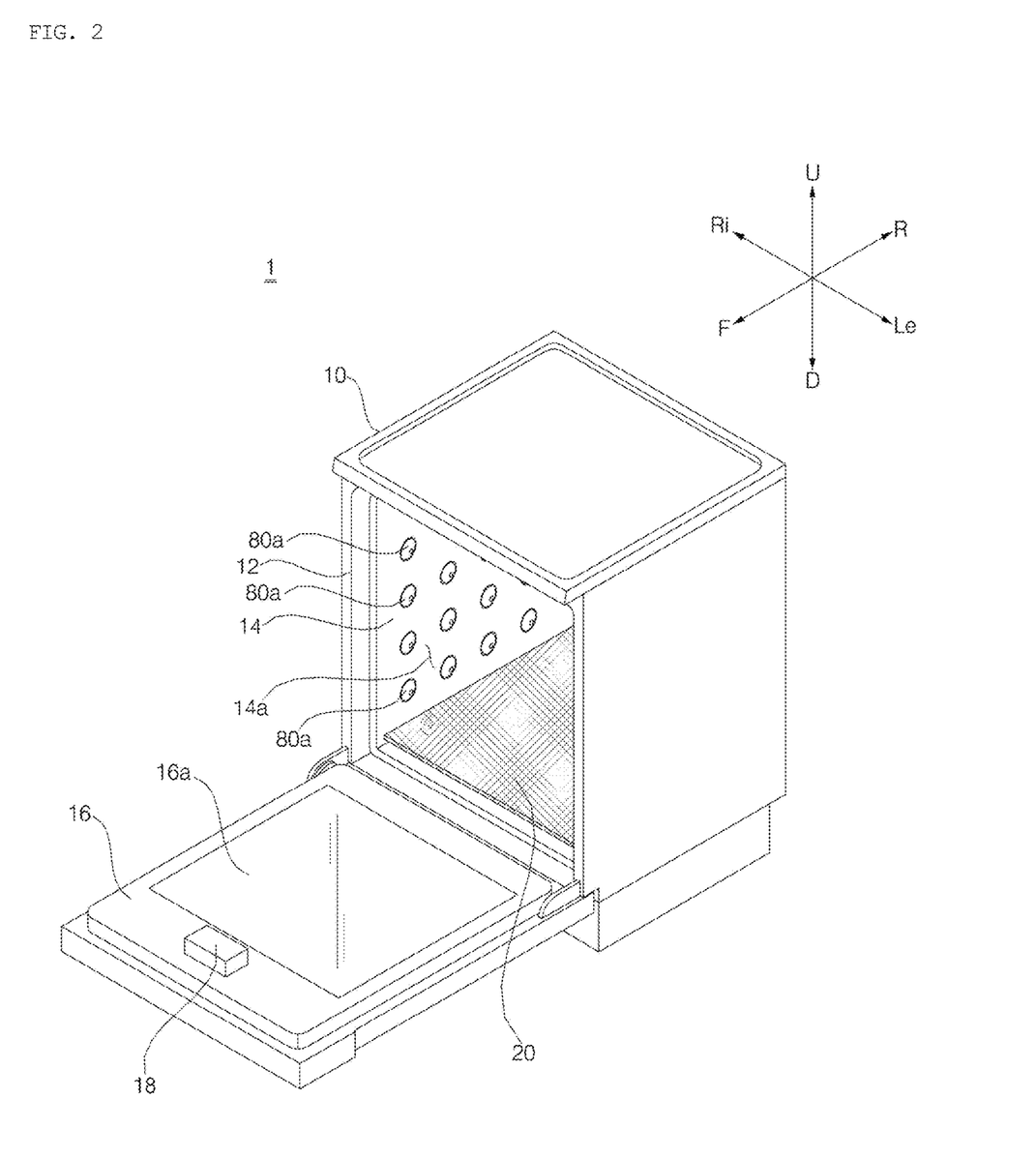
FIG. 2 is a perspective view illustrating the pet bath in accordance with one embodiment of the present disclosure in a state in which a door is open.
Figure 3:
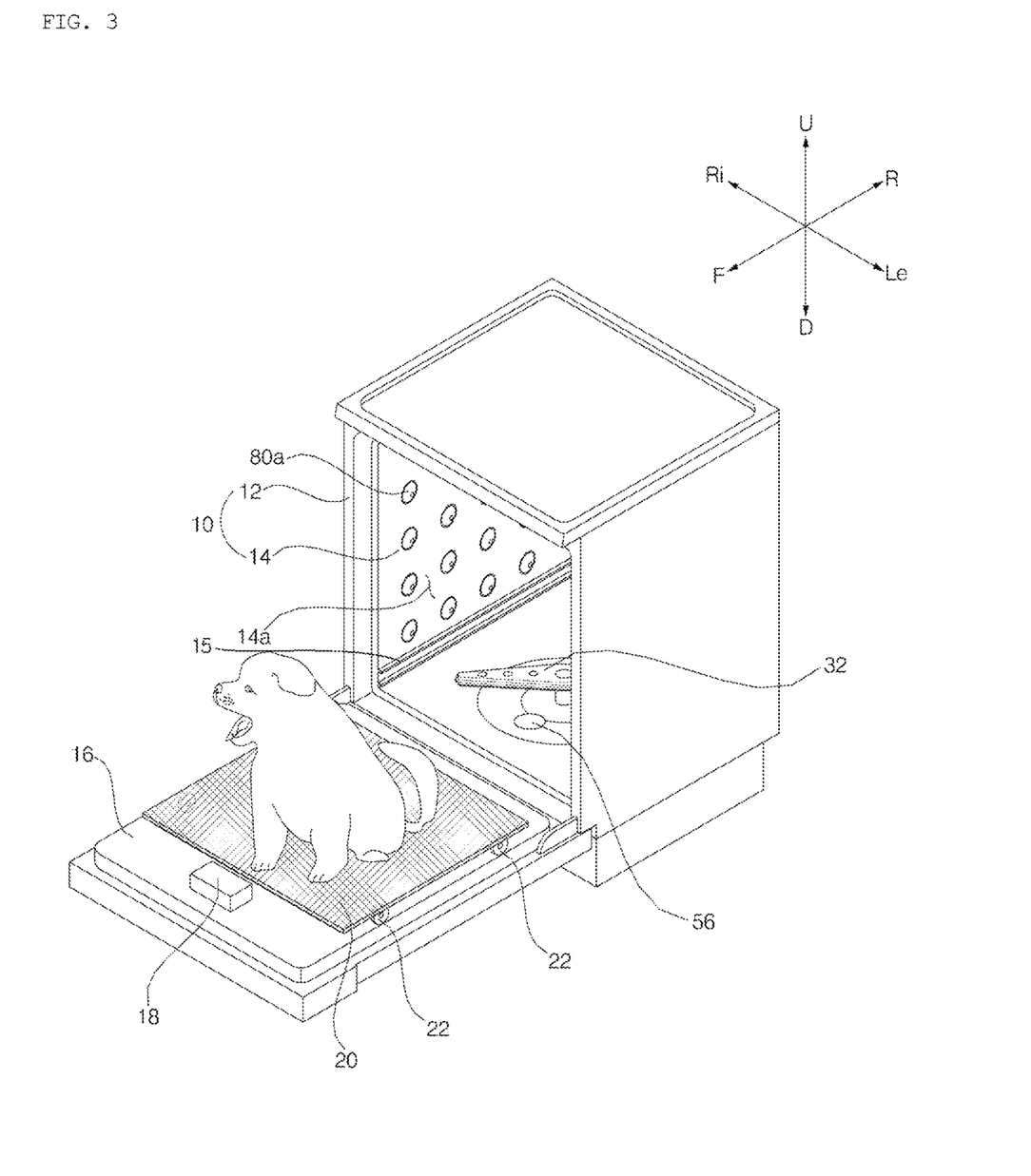
FIG. 3 is a perspective view illustrating the pet bath in accordance with one embodiment of the present disclosure in a state in which the door is open and a stand is withdrawn.
Figure 4:
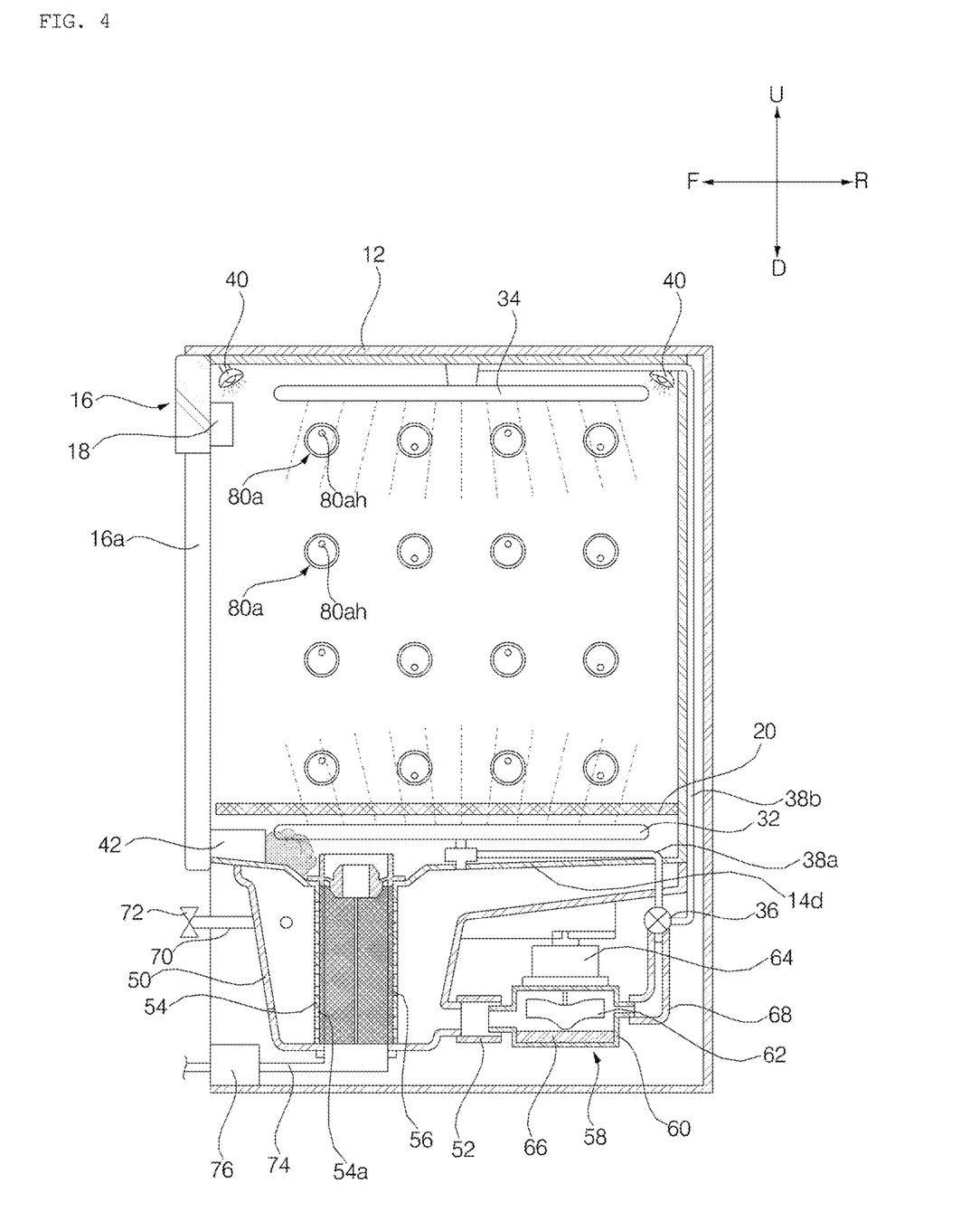
FIG. 4 is a schematic side sectional view of the pet bath in accordance with one embodiment of the present disclosure.

FIG. 1 is a perspective view of a pet bath in accordance with one embodiment of the present disclosure. FIG. 2 is a perspective view illustrating the pet bath in accordance with one embodiment of the present disclosure in a state in which a door is open. FIG. 3 is a perspective view illustrating the pet bath in accordance with one embodiment of the present disclosure in a state in which the door is open and a stand is withdrawn. FIG. 4 is a schematic side sectional view of the pet bath in accordance with one embodiment of the present disclosure.

Hereinafter, referring to FIGS. 1 to 4, the overall configuration of the pet bath in accordance with this embodiment will be described.

A pet bath 1 in accordance with this embodiment includes a casing 10 which forms an external appearance of the pet bath 1 and an open front surface, a door 16 which opens and closes the open front surface of the casing 10, a stand 20 which is configured to support a pet and to drain washing water, a washing device which supplies washing water to a bathing enclosure 14*a* to wash and rinse the pet, and a drying device which supplies air to the bathing enclosure 14*a* to dry the pet.

The casing 10 may include an inner cabinet 14 which defines the bathing enclosure 14*a*, and an outer cabinet 12 which surrounds the inner cabinet 14 and forms the external appearance of the pet bath 1. The inner surface of the outer cabinet 12 is spaced apart from the outer surface of the inner cabinet 14, and thus a circulation water connection pipe 38*b* to supply water to an upper nozzle 34 may be disposed between the inner surface of the outer cabinet 12 and the outer surface of the inner cabinet 14.

The outer cabinet 12 in accordance with this embodiment has a hexahedral box shape having an open front surface. A space in which the inner cabinet 14 is disposed and a space in which the washing device and the drying device are disposed may be formed within the outer cabinet 12. Here, some elements of the washing device and the drying device may be disposed under the bathing enclosure 14*a*.

The inner cabinet 14 in accordance with this embodiment is disposed within the outer cabinet 12, and thus forms the bathing enclosure 14*a* in which the pet is washed, rinsed or dried. The front surface of the inner cabinet 14 is open so that the pet enters and exits the bathing enclosure 14*a* therethrough.

A bottom surface 14*d* of the inner cabinet 14 may be inclined toward a water collection tank 50 so that washing water flows to the water collection tank 50.

A lower nozzle 32, the upper nozzle 34 and the stand 20, which will be described below, may be disposed within the inner cabinet 14 in accordance with this embodiment. Further, lighting devices 40 and a bubble generator 42, which will be described below, may be disposed in the inner cabinet 14.

The door 16 in accordance with this embodiment opens and closes the open front surfaces of the casing 10 and the inner cabinet 14. The lower end of the door 16 may be rotatably fixed to the casing 10, and thus, the door 16 may be rotated using the lower end thereof as a rotary axis to open or close the front surface of the casing 10. When the door 16 is opened, the door 16 may support the withdrawn stand 20.

A part of the door 16 in accordance with this embodiment may include a transparent panel 16*a*. Therefore, when the pet in the inner cabinet 14 is washed, rinsed and dried, a user may check the state of the pet in the bathing enclosure 14*a* through the transparent panel 16*a* or the pet may see the outside through the transparent panel 16*a*, and thus, bathing of the pet may be stably performed.

A dispenser 18 which temporarily accommodates a detergent, such as shampoo, and discharges the detergent to the bathing enclosure 14*a* may be disposed on the inner surface of the door 16. The dispenser 18 in accordance with this embodiment may be disposed above the transparent panel 16*a* formed of a transparent material.

The stand 20 in accordance with this embodiment is disposed at the lower portion of the inner cabinet 14. The stand 20 is detachably disposed on the inner cabinet 14. The stand 20 may be withdrawn in the forward direction of the inner cabinet 14 by rollers 22 installed at the lower portion of the stand 20. Guide parts 15 which guide the rollers 22 installed on the stand 20 may be formed on both side surfaces of the inner cabinet 14. The guide parts 15 in accordance with this embodiment may protrude from the side surfaces of the inner cabinet 14 toward the bathing enclosure 14*a* so as to form surfaces being opposite to the lower ends of the rollers 22 and the upper surface of the stand 20.

The stand 20 may be withdrawn in the forward direction of the casing 10, when the door 16 is completely opened. The stand 20 may be withdrawn to the upper part of the opened door 16.

<Washing Device>

Hereinafter, the washing device of the pet bath in accordance with this embodiment will be described with reference to FIG. 4.

The washing device in accordance with this embodiment includes the water collection tank 50 which stores washing water supplied to the bathing enclosure 14*a*, a circulation pump 58 which pumps washing water stored in the water collection tank 50, spray nozzles which supply washing water pumped by the circulation pump 58 to the bathing enclosure 14*a*, and a circulation water filter 56 which filters washing water flowing from the bathing enclosure 14*a* into the water collection tank 50.

The water collection tank 50 in accordance with the present disclosure may be disposed under the inner cabinet 14. Therefore, washing water supplied to the bathing enclosure 14*a* may flow into the water collection tank 50. The water collection tank 50 may be formed to have a bowl shape, and temporarily store a designated amount of washing water flowing from an external water source or the bathing enclosure 14*a*.

A filter mounting part 54 in which the circulation water filter 56 is mounted may be disposed in the water collection tank 50. A plurality of through holes 54*a* may be formed through the filter mounting part 54 so that washing water flowing in the circulation water filter 56 flows into the water collection tank 50 through the through holes 54*a*.

The circulation pump 58 in accordance with this embodiment may be connected to the water collection tank 50, and pump water stored in the water collection tank 50 to the bathing enclosure 14*a*. The circulation pump 58 in accordance with this embodiment includes a circulation pump housing 60 which is disposed at one side of the water collection tank 50 and forms the external appearance of the circulation pump 58, an impeller 62 which is disposed within the circulation pump housing 60 and is rotated to pump washing water, and a circulation motor 64 which rotates the impeller 62. The circulation pump 58 and the water collection tank 50 may be connected by a water collection tank connection pipe 52.

The circulation pump 58 in accordance with this embodiment may further include a circulation water heater 66 which heats washing water flowing into the circulation pump housing 60. The circulation water heater 66 may heat water flowing into the circulation pump housing 60. Washing water heated by the circulation water heater 66 may be supplied to the bathing enclosure 14*a* due to operation of the circulation motor 64.

The spray nozzles in accordance with this embodiment include the lower nozzle 32 which is disposed in the lower portion of the bathing enclosure 14*a* and sprays washing water upwards, and the upper nozzle 34 which is disposed above the lower nozzle 32 and sprays washing water to the space of the bathing enclosure 14*a*. The washing device in accordance with this embodiment includes a water stream distributor 36 which distributes washing water pumped by the circulation pump 58 to the upper nozzle 34 or the lower nozzle 32. Washing water pumped by the circulation pump 58 may be supplied to the upper nozzle 34 and/or the lower nozzle 32 due to operation of the water stream distributor 36.

The lower nozzle 32 is disposed under the stand 20. The stand 20 may have a structure having a plurality of communication holes so as to minimize disturbance of flow of washing water sprayed by the lower nozzle 32.

The lower nozzle 32 is disposed in the lower portion of the bathing enclosure 14*a*, and sprays washing water upwards. The lower nozzle 32 may include a plurality of spray arms extending in two directions or four directions radially from the center of the lower nozzle 32. The lower nozzle 32 may have a structure in which, when washing water is supplied to the lower nozzle 32, the lower nozzle 32 is rotated by pressure of the washing water supplied to the lower nozzle 32.

The upper nozzle 34 is disposed above the lower nozzle 32, and sprays washing water to the bathing enclosure 14*a*. The upper nozzle 34 is disposed above the stand 20. The upper nozzle 34 may be disposed within a range that does not restrict movement of the pet and does not harm the pet.

The upper nozzle 34 in accordance with this embodiment is disposed in the upper portion of the bathing enclosure 14a. The upper nozzle 34 may include a plurality of spray parts extending in two directions or four directions from the center of the upper nozzle 34. Therefore, the upper nozzle 34 in accordance with this embodiment may be rotated about the center thereof, and spray washing water downwards.

The circulation water filter 56 in accordance with this embodiment filters washing water flowing from the bathing enclosure 14a to the water collection tank 50. That is, the circulation water filter 56 may filter out pet fur from washing water, when the pet is washed or rinsed.

The circulation water filter 56 in accordance with this embodiment may be formed to have a cylindrical shape having a hollow formed therethrough in the vertical direction. A filter net which may filter out pet fur or dirt may be disposed on the circumferential surface of the circulation water filter 56. Therefore, dirt which is heavy in weight may be moved to the open lower part of the circulation water filter 56 and then discharged by the drain pump 76. Further, fur which is light in weight may be filtered out by the filter net provided on the circumferential surface of the circulation water filter 56. The washing water, from which pet fur or dirt is removed by the circulation water filter 56, may flow into the water collection tank 50, and thereby, a designated amount of washing water may be circulated to wash the pet.

The washing device in accordance with this embodiment may further the bubble generator 42 which generates bubbles in washing water flowing within the bathing enclosure 14a. The bubble generator 42 generates bubbles in washing water, to which a detergent is supplied by the dispenser 18. The bubble generator 42 is disposed on the bottom surface of the inner cabinet 14 and generates bubbles in washing water which flows. The bubbles generated by the bubble generator 42 may be introduced into the water collection tank 50, pumped by the circulation pump 58 and then again sprayed to the inside of the bathing enclosure 14a through the spray nozzles.

The washing device in accordance with this embodiment may further include a washing pump connection pipe 68 which connects the circulation pump 58 to the water stream distributor 36, and circulation water connection pipes 38a and 38b which connect the water stream distributor 36 to the lower nozzle 32 and the upper nozzle 34, respectively.

The pet bath 1 in accordance with this embodiment may include a water supply assembly which supplies water from the external water source to the water collection tank 50, and a drain assembly which drains water stored in the water collection tank 50 to the outside.

The water supply assembly includes a water supply pipe 70 which connects the external water source to the water collection tank 50, and a water supply valve 72 which opens and close the water supply pipe 70, and the drain assembly includes a drain pipe 74 which drains water stored in the water collection tank 50 to the outside, and a drain pump 76 which pumps water stored in the water collection tank 50 to the outside through the drain pipe 74.

Drying Device—Embodiment 1

Figure 5:
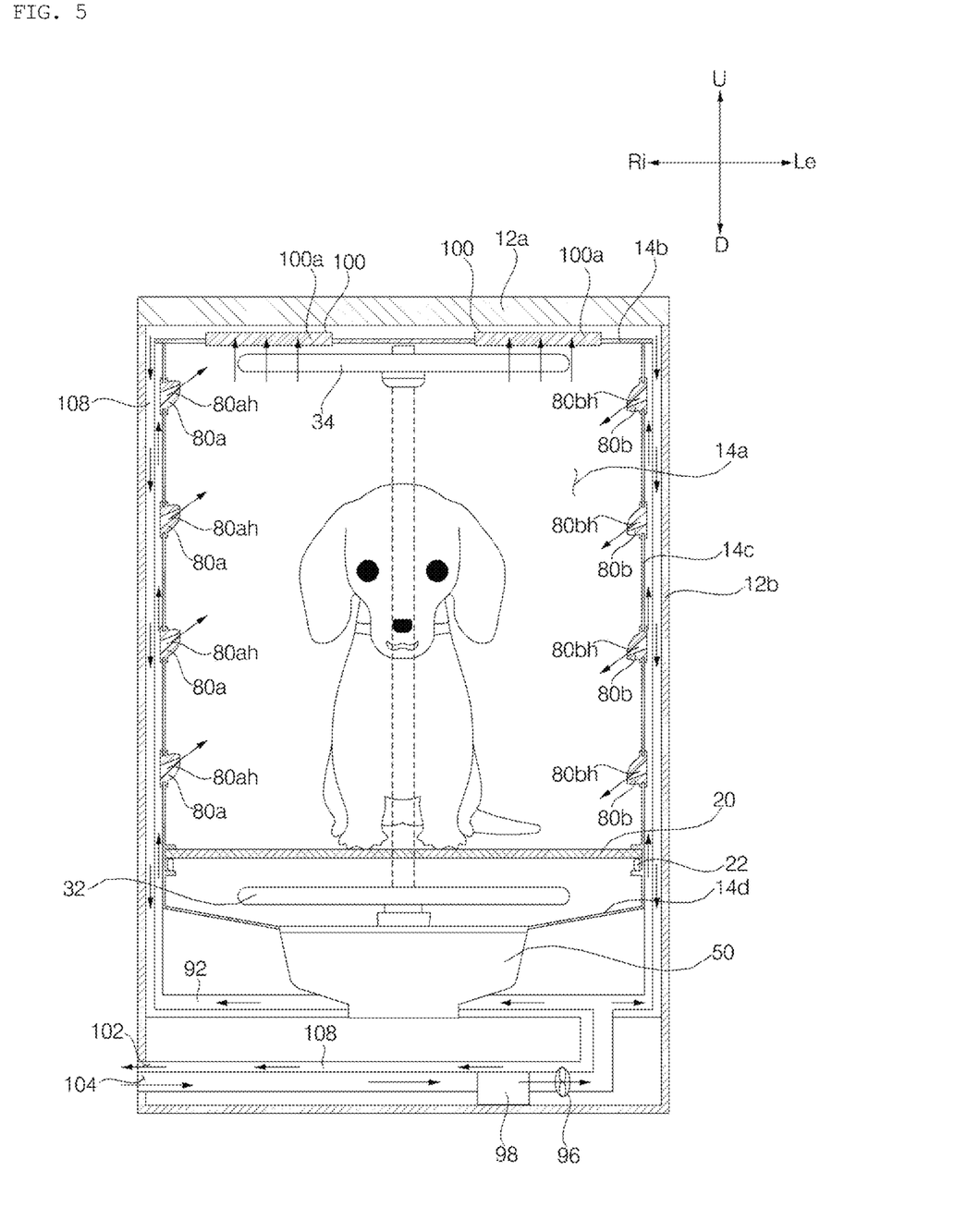
FIG. 5 is a schematic front sectional view of the pet bath in accordance with one embodiment of the present disclosure, illustrating a drying device.
Figure 6:
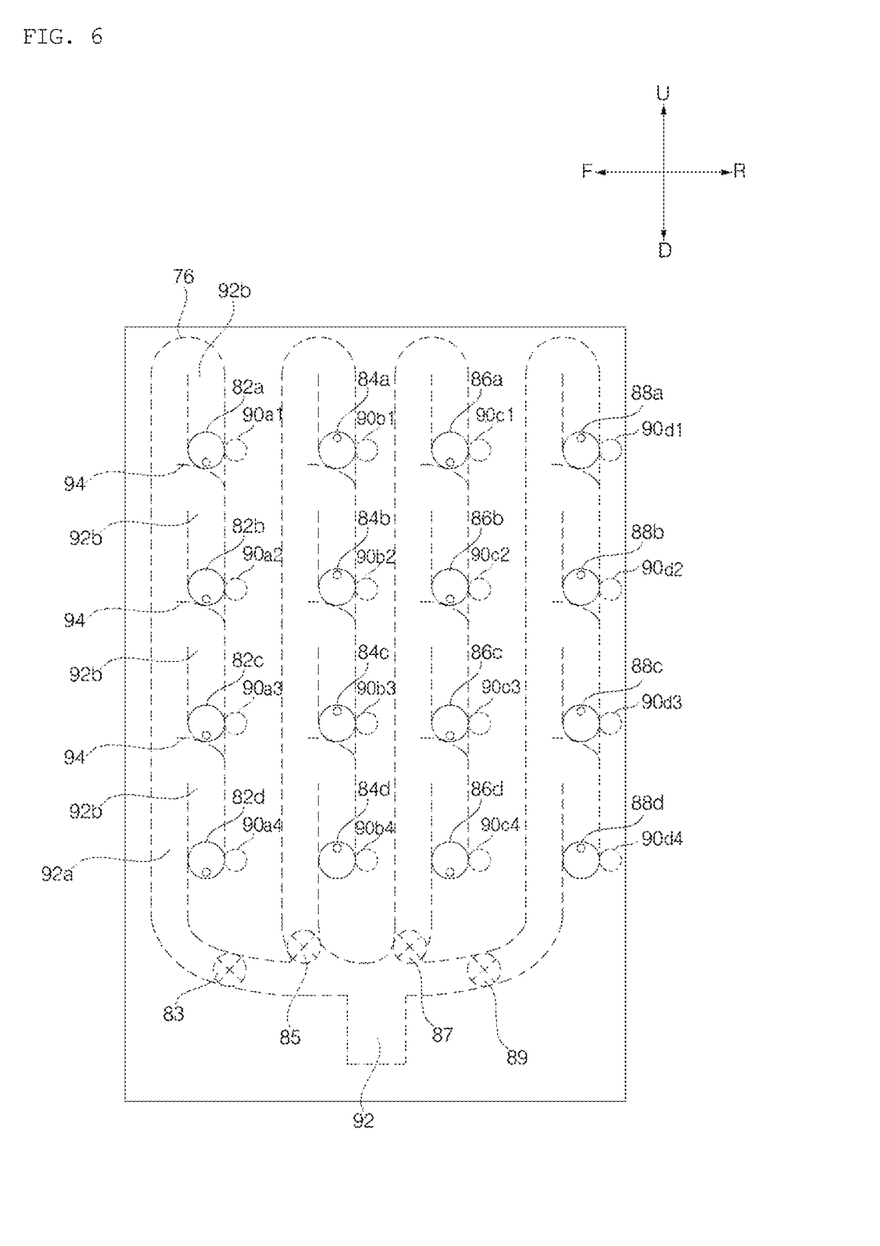
FIG. 6 is a view illustrating a plurality of air nozzles and flow paths formed on one side surface of an inner cabinet of the pet bath in accordance with one embodiment of the present disclosure.
Figure 7:
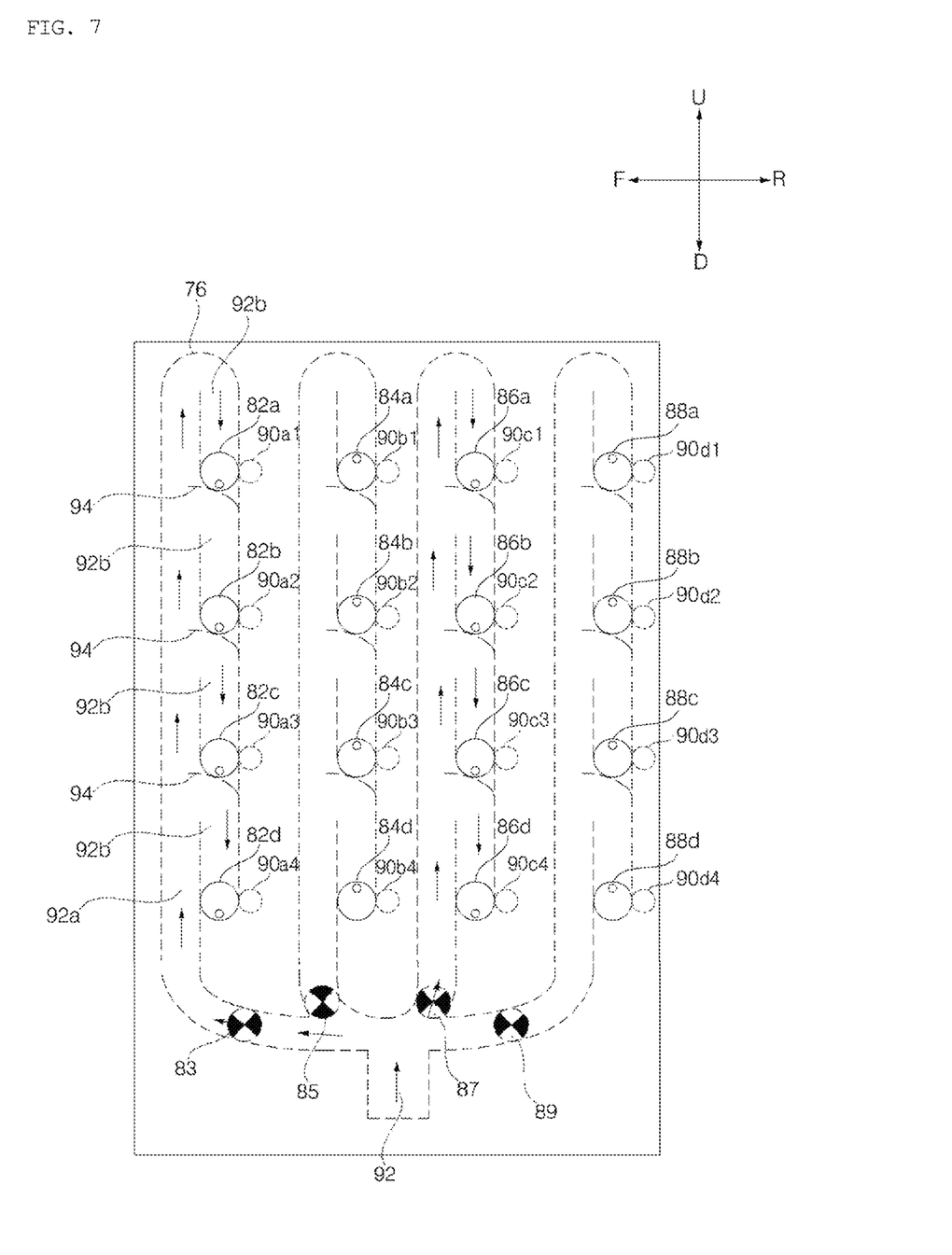
FIG. 7 is a view illustrating operation of a plurality of air nozzle drivers, when air is selectively supplied to the air nozzles of FIG. 6.
Figure 8:
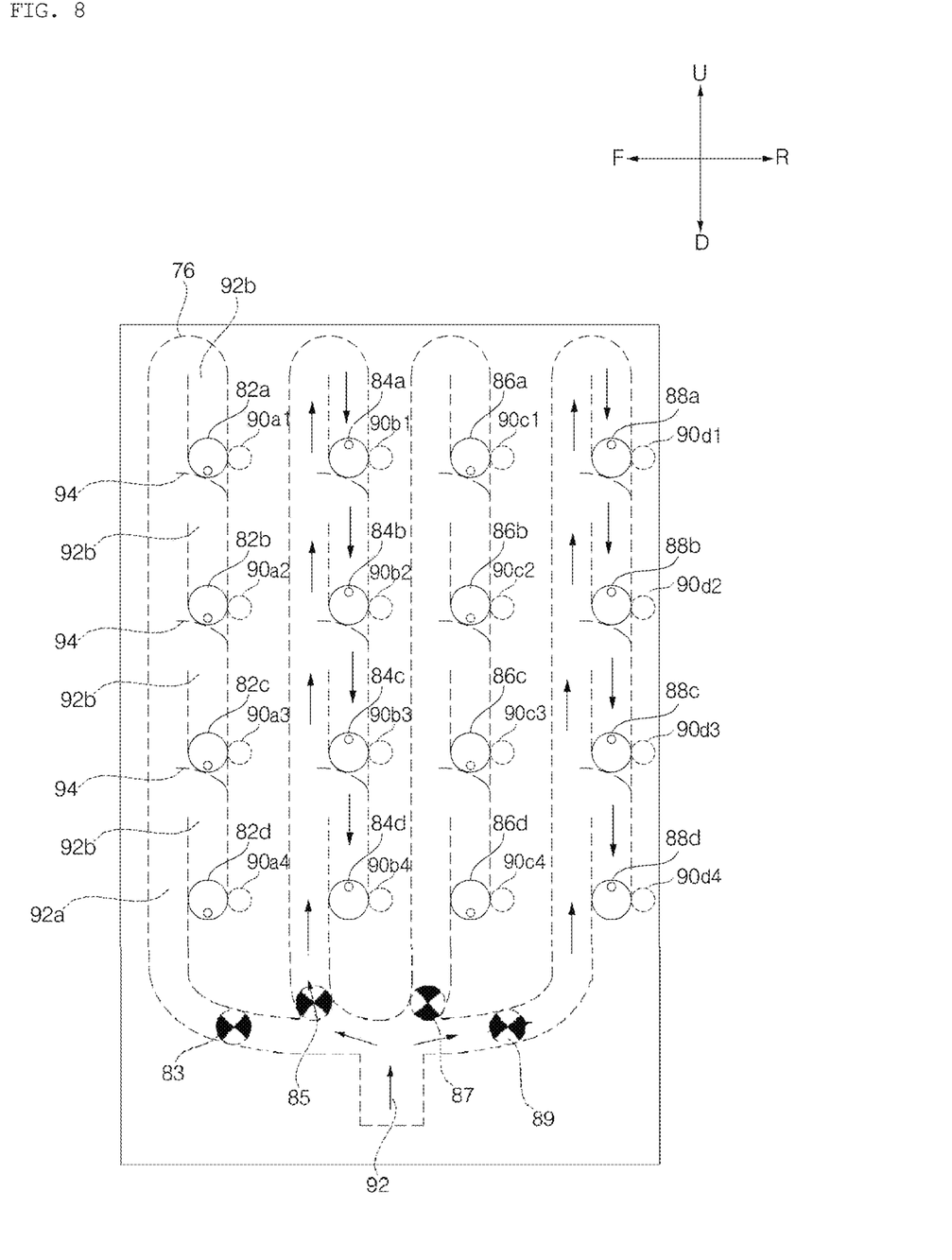
FIG. 8 is a view illustrating operation of the air nozzle drivers, when air is supplied to the air nozzles of FIG. 6, in a different manner from FIG. 7.

FIG. 5 is a schematic front sectional view of the pet bath in accordance with one embodiment of the present disclosure, illustrating the drying device. FIG. 6 is a view illustrating a plurality of air nozzles and flow paths formed on one side surface of the inner cabinet of the pet bath in accordance with one embodiment of the present disclosure. FIG. 7 is a view illustrating operation of a plurality of air nozzle drivers, when air is selectively supplied to the air nozzles of FIG. 6. FIG. 8 is a view illustrating operation of the air nozzle drivers, when air is supplied to the air nozzles of FIG. 6, in a different manner from FIG. 7.

Hereinafter, the drying device of the pet bath in accordance with one embodiment will be described with reference to FIGS. 5 to 7.

The drying device in accordance with this embodiment includes an air blower 96 which generates air flow to the space of the bathing enclosure 14a, air nozzles 80a and 80b which spray air flowing due to operation of the air blower 96 to the inside of the bathing enclosure 14a, and an air heater 98 which heats air flowing due to operation of the air blower 96.

The drying device in accordance with this embodiment is an exhaust-type drying device in which air introduced from the outside is heated by the air heater 98 and then sprayed to the bathing enclosure 14a, and air flowing in the bathing enclosure 14a is discharged to the outside of the casing 10.

Therefore, an outer inflow hole 104 through which external air flows into the casing 10 may be formed at one side of the casing 10, and an outer exhaust hole 102 through which internal air in the bathing enclosure 14a is exhausted to the outside of the casing 10 may be formed at the other side of the casing 10.

The air blower 96 in accordance with this embodiment is disposed in a space between the inner cabinet 14 and the outer cabinet 12. The air heater 98 in accordance with this embodiment is disposed in the space between the inner cabinet 14 and the outer cabinet 12. The air blower 96 and the air heater 98 in accordance with this embodiment may be disposed under the bathing enclosure 14a.

The drying device in accordance with this embodiment may include a plurality of air nozzles 80a and 80b. In the pet bath 1 in accordance with this embodiment, the air nozzles 80a and 80b may be disposed on at least one surface of the inner cabinet 14.

The air nozzles 80a and 80b in accordance with this embodiment may be rotatably disposed on one surface of the inner cabinet 14. In the air nozzles 80a and 80b in accordance with this embodiment, air nozzle holes 80ah and 80bh, through which air passes, are formed at positions of the air nozzles 80a and 80b spaced apart from the centers of rotation thereof by a designated distance. Therefore, the positions of the air nozzle holes 80ah and 80bh may be changed according to rotation of the air nozzles 80a and 80b.

The air nozzles 80a and 80b in accordance with this embodiment may have an approximately hemispherical shape. The air nozzle holes 80ah and 80bh may be located eccentrically with respect to the centers of rotation of the air nozzles 80a and 80b. The air nozzle holes 80ah and 80bh respectively formed in the air nozzles 80a and 80b may be formed in different directions.

In the pet bath 1 in accordance with this embodiment, the air nozzles 80a and 80b may be disposed on both side surfaces of the inner cabinet 14. The air nozzles 80a and 80b in accordance with this embodiment may include a first surface air nozzle group 80a disposed on the right side surface of the inner cabinet 14, and a second surface air nozzle group 80b disposed on the left side surface of the inner cabinet 14.

Each of the first surface air nozzle group 80a and the second surface air nozzle group 80b may include a plurality of air nozzles. The first surface air nozzle group 80a and the second surface air nozzle group 80b in accordance with this embodiment respectively include a plurality of air nozzles corresponding to each other at parts thereof being opposite to each other. However, such a structure is merely one embodiment, and the number of air nozzles belonging to the first surface air nozzle group 80a and the number of air nozzles belonging to the second surface air nozzle group 80b may be different.

Referring to FIG. 5, the drying device in accordance with this embodiment is an exhaust-type drying device in which air outside the outer cabinet 12 flows into the casing 10 and is supplied to the bathing enclosure 14a, and humid air in the bathing enclosure 14a is discharged to the outside of the outer cabinet 12.

Therefore, the outer inflow hole 104, through which external air flows to the inside of the casing 10, and the outer exhaust hole 102, through which internal air in the bathing enclosure 14a is exhausted to the outside of the outer cabinet 12, may be formed in the outer cabinet 12 or a space between the inner cabinet 14 and the outer cabinet 12.

The drying device in accordance with this embodiment includes an inflow path 92 which supplies air flowing due to operation of the air blower 96 to the air nozzles 80a and 80b, and an exhaust flow path 108 which exhausts air discharged from the bathing enclosure 14a to the outside. Some parts of the inflow path 92 and the exhaust flow path 108 in accordance with this embodiment may be disposed between side surfaces 14c of the inner cabinet 14 and side surfaces 12b of the outer cabinet 12. Therefore, the inflow path 92 and the exhaust flow path 108 disposed between the side surfaces 14c of the inner cabinet 14 and the side surfaces 12b of the outer cabinet 12 may be in surface contact with each other, and thus, heat exchange between air flowing in the inflow path 92 and air flowing in the exhaust flow path 108 may be performed.

The inflow path 92 may branch off so as to provide air flowing due to operation of the air blower 96 to the first surface air nozzle group 80a and the second surface air nozzle group 80b.

Inner exhaust holes 100 which exhaust air flowing in the bathing enclosure 14a may be formed through an upper surface 14b of the inner cabinet 14 in accordance with this embodiment. The drying device in accordance with this embodiment includes air filters 100a which are disposed in the inner exhaust holes 100 to filter foreign substances from flowing air. The air filters 100a may filter out pet fur from the flowing air.

The exhaust flow path 108 which connects the inner exhaust holes 100 to the outer exhaust hole 102 is formed between the upper surface 14b of the inner cabinet 14 and an upper surface 12a of the outer cabinet 12. The outer exhaust hole 102 in accordance with this embodiment may be formed at the lower end of the front portion of the casing 10, and air exhausted from the bathing enclosure 14a may be exhausted frontwards through the outer exhaust hole 102. Therefore, the exhaust flow path 108 may extend downwards along both sides of the inner cabinet 14 from the upper end of the inner cabinet 14, and then extend downwards from the side surfaces 14c of the inner cabinet 14.

Referring to FIG. 6, the first surface air nozzle group 80a may include a plurality of columns of air nozzle groups 82, 84, 86 and 88. Each of the columns of air nozzle groups 82, 84, 86 and 88 is configured such that a plurality of air nozzles is connected by the same flow path.

That is, referring to FIG. 6, the first surface air nozzle group 80a includes a first column air nozzle group 82a, 82b, 82c and 82d, a second column air nozzle group 84a, 84b, 84c and 84d, a third column air nozzle group 86a, 86b, 86c and 86d, and a fourth column air nozzle group 88a, 88b, 88c and 88d. Further, the first column air nozzle group 82a, 82b, 82c and 82d includes a plurality of air nozzles 82a, 82b, 82c and 82d, which are arranged in the vertical direction. The first column air nozzle group 82a, 82b, 82c and 82d in accordance with this embodiment includes a first row air nozzle 82a, a second row air nozzle 82b, a third row air nozzle 82c and a fourth row air nozzle 82d, which are arranged from the top.

In the same manner, each of the second column air nozzle group 84a, 84b, 84c and 84d, the third column air nozzle group 86a, 86b, 86c and 86d, and the fourth column air nozzle group 88a, 88b, 88c and 88d includes a plurality of air nozzles 82a, 82b, 82c and 82d, which are arranged in the vertical direction.

Further, the pet bath 1 in accordance with this embodiment includes a plurality of air nozzle valves 83, 85, 87 and 89 which adjust air supplied to the columns of air nozzle groups 82, 84, 86 and 88. The pet bath 1 in accordance with this embodiment includes a first air nozzle valve 83 to adjust air supplied to the first column air nozzle group 82a, 82b, 82c and 82d, a second air nozzle valve 85 to adjust air supplied to the second column air nozzle group 84a, 84b, 84c and 84d, a third air nozzle valve 87 to adjust air supplied to the third column air nozzle group 86a, 86b, 86c and 86d, and a fourth air nozzle valve 89 to adjust air supplied to the fourth column air nozzle group 88a, 88b, 88c and 88d.

An air nozzle driver 90 is disposed at each of the air nozzles 82, 84, 86 and 88 in accordance with this embodiment so as to rotate each air nozzle. The air nozzle drivers 90 in accordance with this embodiment include a plurality of column driver groups 90a, 90b, 90c and 90d including air nozzle drivers, each of which is connected to a corresponding one of the air nozzles of the air nozzle groups, so as to rotate each of the air nozzles of the air nozzle groups.

That is, the air nozzle drivers 90a, 90b, 90c and 90d in accordance with this embodiment include a first column driver group 90a1, 90a2, 90a3 and 90a4 including air nozzle drivers, each of which is connected to a corresponding one of the air nozzles of the first column air nozzle group 82a, 82b, 82c and 82d, a second column driver group 90b1, 90b2, 90b3 and 90b4 including air nozzle drivers, each of which is connected to a corresponding one of the air nozzles of the second column air nozzle group 84a, 84b, 84c and 84d, a third column driver group 90c1, 90c2, 90c3 and 90c4 including air nozzle drivers, each of which is connected to a corresponding one of the air nozzles of the third column air nozzle group 86a, 86b, 86c and 86d, and a fourth column driver group 90d1, 90d2, 90d3 and 90d4 including air nozzle drivers, each of which is connected to a corresponding one of the air nozzles of the fourth column air nozzle group 88a, 88b, 88c and 88d.

Each of the column driver groups 90a, 90b, 90c and 90d may be configured such that, when at least one of the air nozzle valves 83, 85, 87 and 89 is opened, the air nozzle drivers of the corresponding column driver group connected to the air nozzle group in the corresponding column to which air is supplied through the opened air nozzle valve may be operated.

Referring to FIG. 7, when the first air nozzle valve 83 and the third air nozzle valve 87 are opened, the first column driver group 90a1, 90a2, 90a3 and 90a4 connected to the air nozzles belonging to the first column air nozzle group 82a, 82b, 82c and 82d, and the third column driver group 90c1, 90c2, 90c3 and 90c4 connected to the air nozzles belonging to the third column air nozzle group 86a, 86b, 86c and 86d are operated. In the same manner, referring to FIG. 8, when the second air nozzle valve 85 and the fourth air nozzle valve 89 are opened, the second column driver group 90$b$1, 90$b$2, 90$b$3 and 90$b$4 connected to the air nozzles belonging to the second column air nozzle group 84$a$, 84$b$, 84$c$ and 84$d$, and the fourth column driver group 90$d$1, 90$d$2, 90$d$3 and 90$d$4 connected to the air nozzles belonging to the fourth column air nozzle group 88$a$, 88$b$, 88$c$ and 88$d$ are operated.

A common flow path 92$a$ configured to raise air flowing from the air nozzle valves 83, 85, 87 and 89 and a plurality of branch flow paths 92$b$ branched off from the common flow path 92$a$ to lower flowing air and connected to the air nozzles are disposed in the air nozzle group of each column. Here, the common flow path 92$a$ and the branch flow paths 92$b$ may be inflow paths which supply air flowing due to operation of the air blower 96 to the air nozzles.

That is, each of the branch flow paths 92$b$ connected to a corresponding one of the air nozzles extends upwards, and thus prevent washing water from flowing into the common flow path 92$b$ even if the washing water scattering in the bathing enclosure 14$a$ flows into the air nozzles.

One common flow path 92$a$ and four branch flow paths 92$b$ may be disposed in the air nozzle group in each column.

A flow path guide 94 which guides air flowing along the common flow path 92$a$ to the branch flow path 92$b$ may be disposed at the upper portion of the branch flow path 92$b$. The flow path guide 94 may protrude from the upper end of the branch flow path 92$b$ toward the common flow path 92$a$.

As such, the first surface air nozzle group 80$a$ in accordance with this embodiment may include the plurality of columns of air nozzle groups 82, 84, 86 and 88 including a plurality of rows of air nozzles, and such a structure may be applied to the second surface air nozzle group 80$b$.

Drying Device—Embodiment 2

Figure 9:
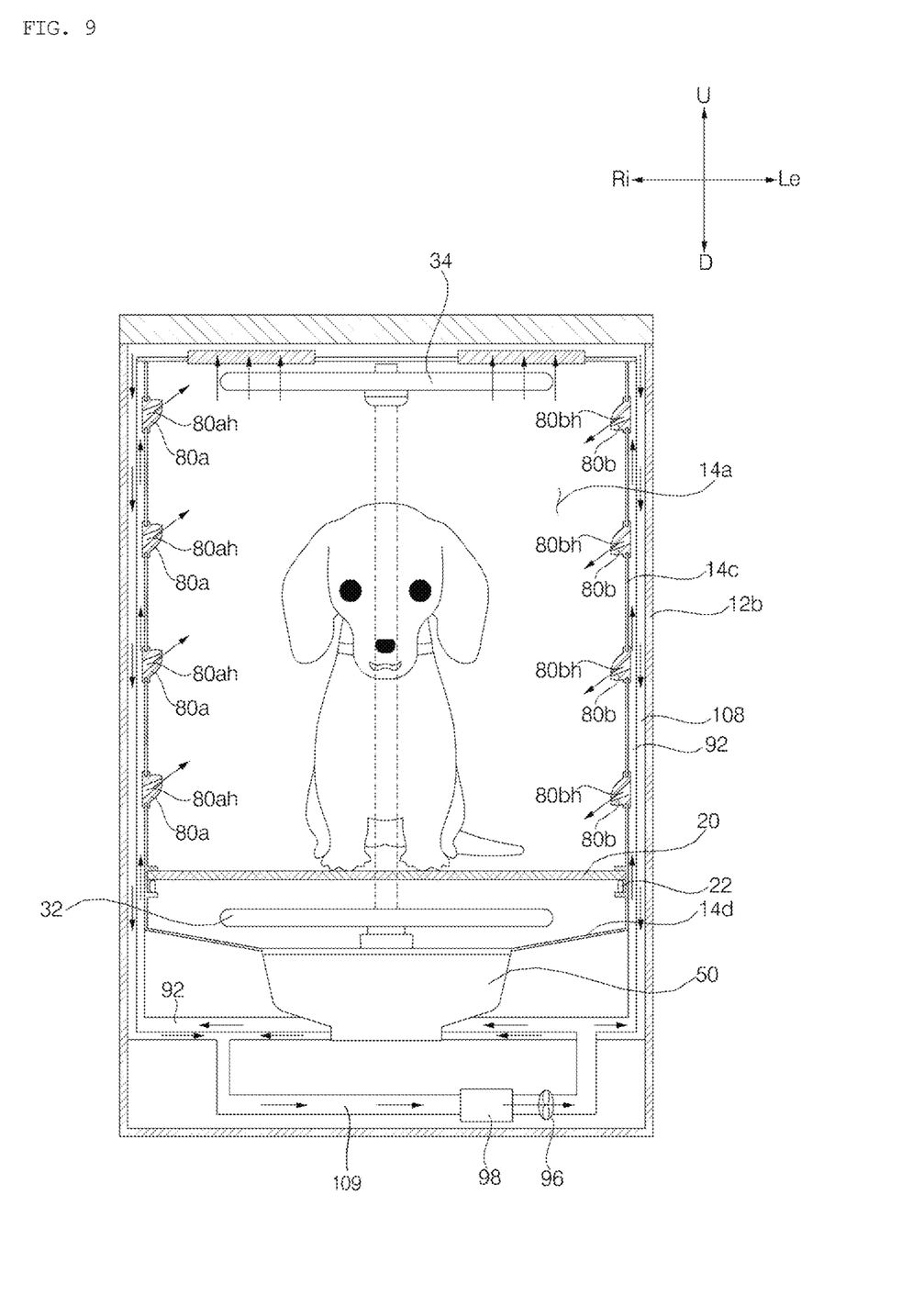
FIG. 9 is a view illustrating a plurality of air nozzles and flow paths formed on one side surface of an inner cabinet of a pet bath in accordance with another embodiment of the present disclosure.

FIG. 9 is a schematic front sectional view of a pet bath in accordance with another embodiment of the present disclosure, illustrating a drying device.

Hereinafter, some elements of the drying device in accordance with this embodiment and dispositions thereof, which differ from those of the drying device in accordance with the former embodiment, will be mainly described with reference to FIG. 9.

The drying device in accordance with this embodiment is a circulation-type drying device in which air blown by an air blower 96 is heated by an air heater 98 and sprayed to a bathing enclosure 14$a$, and air flowing in the bathing enclosure 14$a$ is again circulated to the air blower 96.

The circulation-type drying device in accordance with this embodiment is not provided with an outer drain hole and an outer inflow hole connected to a drying flow path. Of course, an air path which communicates with the outside to secure safety of a pet located in the bathing enclosure 14$a$ may be separately formed.

An exhaust flow path 108, along which air exhausted from the bathing enclosure 14$a$ flows, is formed between an upper surface 14$b$ of an inner cabinet 14 and an upper surface 12$a$ of an outer cabinet 12 and between side surfaces 14$c$ of the inner cabinet 14 and side surfaces 12$b$ of the outer cabinet 12, and a circulation flow path 109, along which air flowing along the exhaust flow path 108 flows to a space in which the air blower 96 is disposed, is formed below the inner cabinet 14.

An inflow path 92 which guides air flowing due to operation of the air blower 96 to air nozzles 80$a$ an 80$b$ is formed between the side surfaces 14$c$ of the inner cabinet 14 and the side surfaces 12$b$ of the outer cabinet 12. Therefore, air flowing due to operation of the air blower 96 via the air heater 98 flows to the bathing enclosure 14$a$ of the air nozzles 80$a$ and 80$b$. Further, air passing through air filters 100$a$ of the bathing enclosure 14$a$ may be circulated to the air heater 98 and the air blower 96 via the exhaust flow path 108 and the circulation flow path 109.

The air heater 98 in accordance with this embodiment may employ a heat pump which performs compression and phase change of a refrigerant and thus exchanges heat with air. That is, the air heater 98 may be a heat pump including a compressor (not shown) which compresses the refrigerant, a condenser (not shown) which condenses the compressed refrigerant, an expander (not shown) which expands the condensed refrigerant, and an evaporator (not shown) which evaporates the expanded refrigerant.

In this case, air exhausted from the bathing enclosure 14$a$ may exchange heat with the evaporator (not shown) so that moisture in the air may be condensed, and thereafter exchange heat with the condenser (not shown) so that heated high-temperature and low-humidity air may be supplied to the bathing enclosure 14$a$.

<Controller-Related Elements>

Figure 10:
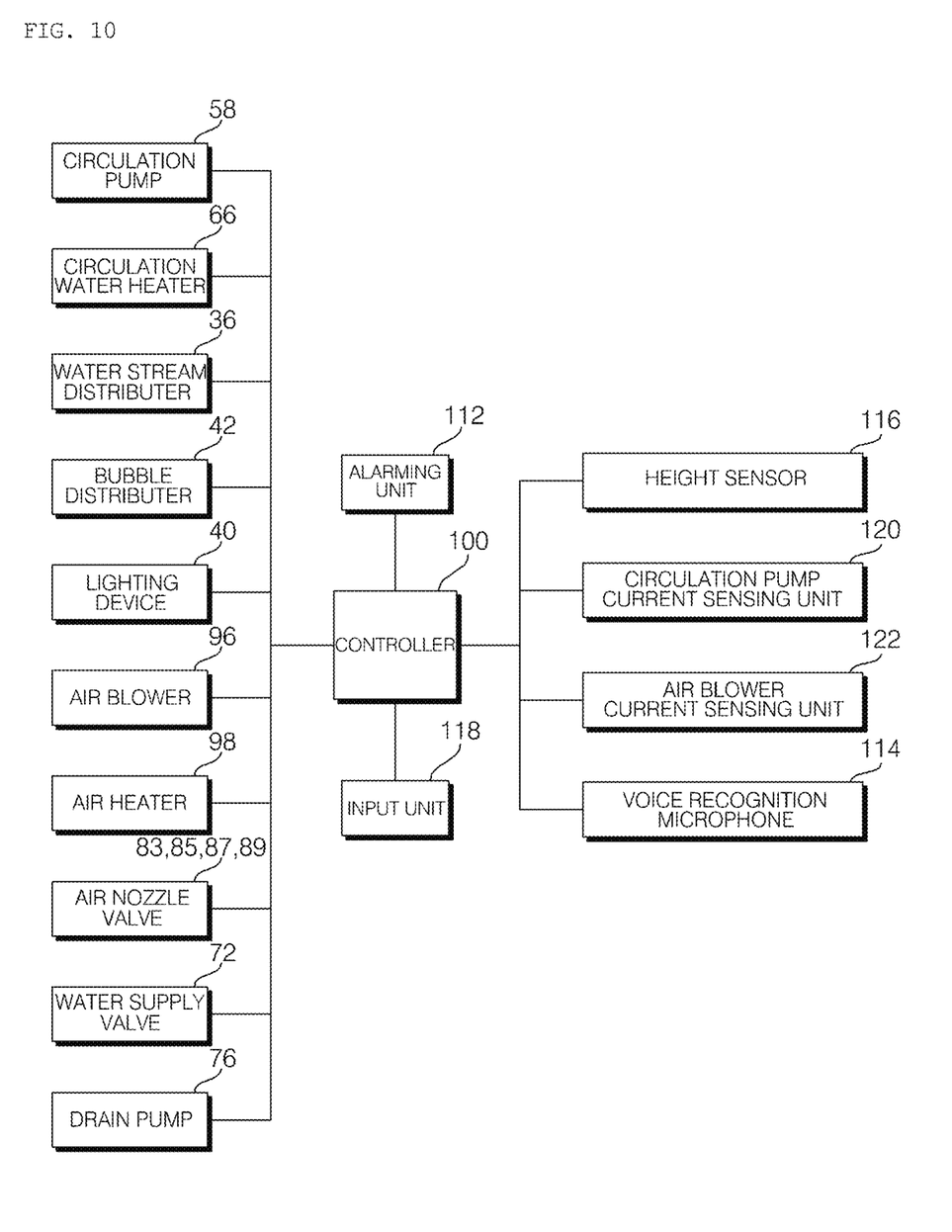
FIG. 10 is a block diagram illustrating elements related to a controller of the pet bath in accordance with one embodiment of the present disclosure.

FIG. 10 is a block diagram illustrating elements related to a controller of the pet bath in accordance with one embodiment of the present disclosure.

Hereinafter, referring to FIG. 10, the controller in accordance with this embodiment and the elements related thereto will be descried.

The pet bath 1 in accordance with this embodiment may further include a controller 110 which controls operation of the washing device or the drying device.

The pet bath 1 in accordance with this embodiment may further include the lighting devices 40 which illuminate the inside of the bathing enclosure 14$a$. The lighting devices 40 may be disposed at upper corners of the bathing enclosure 14$a$. The lighting devices 40 in accordance with this embodiment illuminate the inside of the bathing enclosure 14$a$, and may thus provide comfort to a pet located in the bathing enclosure 14$a$. The lighting devices 40 in accordance with this embodiment may use LED lamps which emit soft light to the inside of the bathing enclosure 14$a$, or infrared lamps which emit far-infrared light to the inside of the bathing enclosure 14$a$ to treat skin conditions of the pet.

The pet bath 1 in accordance with this embodiment may further include a height sensor 116 which senses the height of the pet located in the bathing enclosure 14$a$, and a voice recognition microphone 114 which senses sounds made by the pet.

The height sensor 116 in accordance with this embodiment radiates laser light perpendicularly to the bottom surface 14$d$ of the bathing enclosure 14$a$ and may thus measure the size of the pet located in the bathing enclosure 14$a$, or includes a plurality of proximity sensors disposed at one side surface of the inner cabinet 14 to measure the size of the pet. The height sensor 116 in accordance with this embodiment may confirm whether or not a pet is present within the bathing enclosure 14$a$ in addition to the size of the pet.

The pet bath 1 in accordance with this embodiment may further include an alarm unit 112 which informs the user of the state of use of the pet bath 1 or an emergency state.

The pet bath 1 in accordance with this embodiment may further include an input unit 118 through which the user inputs conditions necessary for bathing the pet. The user may directly input a size or weight of the pet, a time necessary for bathing the pet, etc. through the input unit 118.

The controller 110 in accordance with the present disclosure may control operation of the washing device. That is, the controller 110 may control operation of the circulation pump 58 or control operation of the water stream distributor 36 according to the size or degree of contamination of the pet located in the bathing enclosure 14*a*.

The controller 110 in accordance with the present disclosure may control operation of the drying device. That is, the controller 110 may control the RPM of the air blower 96 or control operation of the air heater 98 according to the size of the pet or the amount of fur of the pet located in the bathing enclosure 14*a*.

The controller 110 in accordance with the present disclosure opens and closes the water supply valve 72, or operates the drain pump 76. The controller 110 in accordance with the present disclosure may control the lighting devices 40 so as to provide comfort to the pet located in the bathing enclosure 14*a*.

Further, the pet bath 1 in accordance with the present disclosure may further include a circulation pump current sensing unit 120 which senses an amount of current applied to the circulation motor 64 when the circulation pump 58 is operated, and an air blower current sensing unit 122 which senses an amount of current applied to the air blower 96 when the air blower 96 is operated.

The controller 110 may sense whether or not the circulation water filter 56 is clogged or whether or not the air filters 100*a* are clogged based on the amounts of current sensed by the circulation pump current sensing unit 120 and the air blower current sensing unit 122.

As apparent from the above description, a pet bath in accordance with the present disclosure has one or more of the following effects.

First, a water collection tank, a lower nozzle and an upper nozzle configured to wash a pet are disposed and an air blower and air nozzles configured to dry the pet are disposed in one pet bath, and thus, the pet may be totally cared for in one space.

Second, a spraying direction of a plurality of air nozzles is changeable, and may thus effectively remove moisture from the body of the pet located in a bathing enclosure and thereby shorten a time taken to bathe the pet.

Third, since washing water used to wash the pet is stored in a water collection tank, supplied to the bathing enclosure by a circulation pump and supplied again to the water collection tank via a circulation water filter, a designated amount of washing water is circulated, and thus, a water consumption amount used to wash the pet may be reduced.

Fourth, a direction of air nozzle holes of the air nozzles to spray air is changeable, and may thus prevent heated air from being sprayed only to a designated region in the bathing enclosure, thereby safely drying the pet.

Fifth, since an air inflow path connected to the air nozzles has a structure in which air flows to the air nozzles through a common flow path configured to raise air and branch flow paths configured to lower air, water is not introduced into the drying device even if water splashes when washing or rinsing the pet in the pet bath, and thus safe use of the pet bath may be ensured.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A pet bath comprising:
    an outer cabinet that forms an external appearance of the pet bath, the outer cabinet having an open front surface;
    an inner cabinet provided within the outer cabinet and defining a bathing enclosure therein, the inner cabinet having an open front surface;
    a door configured to open and close the open front surfaces of the outer cabinet and the inner cabinet;
    a washing device configured to spray washing water to an inside of the bathing enclosure;
    an air blower disposed between the outer cabinet and the inner cabinet and configured to generate air flow;
    an air heater configured to heat air flowing through the air blower; and
    a plurality of air nozzles rotatably disposed on at least one surface of the inner cabinet and defining air nozzle holes that are configured to blow air from the air blower to the inside of the bathing enclosure,
    wherein the air nozzle holes are spaced apart from centers of rotation of the corresponding air nozzles by a predetermined distance, and
    wherein the air nozzles are provided as a plurality of air nozzle groups each arranged in a column, each of the plurality of air nozzle groups being connected to a corresponding flow path that connects two or more air nozzles in each air nozzle group.

2. The pet bath according to claim 1, wherein the air nozzles have a hemispherical shape, and the air nozzle holes are located eccentrically with respect to the centers of rotation of the air nozzles.

3. The pet bath according to claim 1, further comprising a plurality of drivers, each of the plurality of drivers being connected to one side of a corresponding one of the air nozzles and configured to rotate the corresponding one of the air nozzles.

4. The pet bath according to claim 1, wherein a plurality of flow paths are provided at one side surface of the inner cabinet.

5. The pet bath according to claim 4, wherein a plurality of flow paths are provided between an outer surface of the inner cabinet and an inner surface of the outer cabinet.

6. The pet bath according to claim 1, further comprising a plurality of air nozzle valves, each of the plurality of air nozzle valves being configured to adjust air flowing to each of the plurality of air nozzle groups.

7. The pet bath according to claim 6, comprising a plurality of driver groups that are arranged in a column, each of the driver groups being connected to a corresponding column of the plurality of air nozzle groups and configured to rotate the air nozzles.

8. The pet bath according to claim 7, wherein the plurality of driver groups are configured, based on one or more of the air nozzle valves being opened, to be operated to rotate the corresponding air nozzles to which air is being supplied through the opened air nozzle valves.

9. The pet bath according to claim 1, wherein the air nozzles in each of the plurality of air nozzle groups are connected to one another by the corresponding flow path that is extended along a vertical direction.

10. The pet bath according to claim 1, wherein the air nozzles in each of the plurality of air nozzle groups are connected by a corresponding common flow path that is configured to guide air being supplied to the air nozzles in an upward direction, and
    wherein each of the common flow paths include a plurality of branch flow paths that are branched off from the common flow path and configured to guide the supplied air in a downward direction toward a corresponding one of the air nozzles.

11. The pet bath according to claim 10, wherein a flow path guide configured to guide air flowing along the common flow path toward each of the branch flow paths is disposed at an upper portion of the corresponding branch flow path.

12. The pet bath according to claim 1, wherein:
inner exhaust holes configured to exhaust air flowing in the bathing enclosure are defined in an upper surface of the inner cabinet; and
an outer inflow hole configured to allow external air to flow into the bathing enclosure and an outer exhaust hole configured to exhaust air flowing through the inner exhaust holes to the outside are defined in the outer cabinet or in a space between the inner cabinet and the outer cabinet.

13. The pet bath according to claim 1, wherein:
inner exhaust holes configured to exhaust air flowing in the bathing enclosure are defined in an upper surface of the inner cabinet; and
an inflow path configured to guide the air flowing due to operation of the air blower to the air nozzles, an exhaust flow path along which air exhausted from the bathing enclosure via the inner exhaust holes flows, and a circulation flow path along which air flowing along the exhaust flow path flows to a space, in which the air blower is disposed, are disposed between the inner cabinet and the outer cabinet.

14. The pet bath according to claim 13, wherein the air heater is a heat pump comprising a compressor configured to compress a refrigerant, a condenser configured to condense the compressed refrigerant, an expander configured to expand the condensed refrigerant, and an evaporator configured to evaporate the expanded refrigerant, and
wherein air flowing into the circulation flow path sequentially passes through the evaporator and the condenser, and is supplied to the circulation flow path.

15. The pet bath according to claim 1, wherein the washing device comprises:
a water collection tank disposed under the inner cabinet and defining a washing water storage space;
a circulation pump configured to pump washing water stored in the water collection tank;
a lower nozzle disposed in a lower portion of the bathing enclosure and configured to spray the washing water pumped by the circulation pump to the bathing enclosure; and
an upper nozzle disposed above the lower nozzle and configured to spray the washing water pumped by the circulation pump to the bathing enclosure.

16. A pet bath comprising:
an outer cabinet that forms an external appearance of the pet bath, the outer cabinet having an open front surface;
an inner cabinet provided within the outer cabinet and defining a bathing enclosure therein, the inner cabinet having an open front surface;
a door configured to open and close the open front surfaces of the outer cabinet and the inner cabinet;
a washing device configured to spray washing water to an inside of the bathing enclosure;
an air blower disposed between the outer cabinet and the inner cabinet and configured to generate air flow;
an air heater configured to heat air flowing through the air blower; and
a plurality of air nozzles rotatably disposed on at least one surface of the inner cabinet and defining air nozzle holes that are configured to blow air from the air blower to the inside of the bathing enclosure,
wherein the air nozzle holes are spaced apart from centers of rotation of the corresponding air nozzles by a predetermined distance, and
wherein the washing device comprises:
a water collection tank disposed under the inner cabinet and defining a washing water storage space,
a circulation pump configured to pump washing water stored in the water collection tank,
a lower nozzle disposed in a lower portion of the bathing enclosure and configured to spray the washing water pumped by the circulation pump to the bathing enclosure, and
an upper nozzle disposed above the lower nozzle and configured to spray the washing water pumped by the circulation pump to the bathing enclosure.

* * * * *